United States Patent
Eromäki

(10) Patent No.: US 7,585,122 B2
(45) Date of Patent: Sep. 8, 2009

(54) APERTURE CONSTRUCTION FOR A MOBILE CAMERA

(75) Inventor: Marko Eromäki, Tampere (FI)

(73) Assignee: Nokia Corporation, Espoo (FI)

( * ) Notice: Subject to any disclaimer, the term of this patent is extended or adjusted under 35 U.S.C. 154(b) by 338 days.

(21) Appl. No.: 11/377,905

(22) Filed: Mar. 15, 2006

(65) Prior Publication Data

US 2007/0216803 A1    Sep. 20, 2007

(51) Int. Cl.
*G02F 1/00* (2006.01)
*G02F 1/03* (2006.01)
*G02F 1/07* (2006.01)

(52) U.S. Cl. ........................ 396/506; 359/249

(58) Field of Classification Search .............. 396/262, 396/457, 506, 448; 359/273, 248, 249; 348/68
See application file for complete search history.

(56) References Cited

U.S. PATENT DOCUMENTS

| | | | |
|---|---|---|---|
| 5,047,847 A * | 9/1991 | Toda et al. ................ | 348/68 |
| 6,027,260 A | 2/2000 | Oda et al. ................ | 396/497 |
| 6,621,616 B1 * | 9/2003 | Bauer et al. .............. | 359/273 |
| 2003/0212306 A1 | 11/2003 | Banik ..................... | 600/300 |
| 2005/0157893 A1 | 7/2005 | Pelrine et al. ............. | 381/190 |

FOREIGN PATENT DOCUMENTS

| | | |
|---|---|---|
| GB | 993363 | 5/1965 |
| KR | 10-0650190 | 11/2006 |
| WO | 01/06575 A1 | 1/2001 |

OTHER PUBLICATIONS

Korean Patent Abstracts; Publication No. 100650190; Date of Publication Nov. 20, 2006.
Extended European Search Report (Application No. 07 712 603.5), dated Jul. 9, 2009 (6 pages).
Kornbluh, R. et al, "Electrostrictive Polymer Artificial Muscle Actuators", Proceedings of the 1998 IEEE International Conference on Robotics & Automation, Leuven, Belgium — May 1998, (pp. 2147-2154).

* cited by examiner

*Primary Examiner*—Melissa J Koval
(74) *Attorney, Agent, or Firm*—Ware, Fressola, Van Der Sluys & Adolphson LLP

(57) ABSTRACT

An adjustable aperture construction for a camera comprises at least two electrodes, and an electrical circuit for applying a voltage to the electrodes in order to create an electric field between the electrodes. In addition the construction comprises a center unit with a hole in the middle as an aperture, where the center unit is made of an electroactive material and placed essentially between the electrodes. The center unit is then deformed, expanded or retracted by applying the electric field between the electrodes using the electrical circuit thereby adjusting the aperture in the center unit.

10 Claims, 2 Drawing Sheets

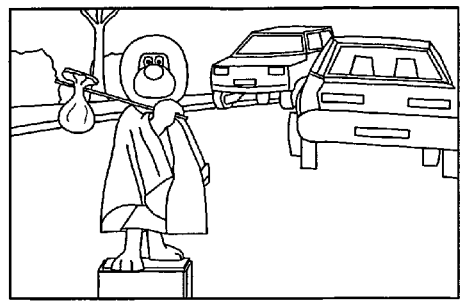
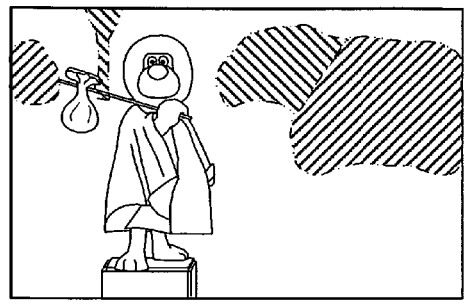
FIG. 1A  FIG. 1B
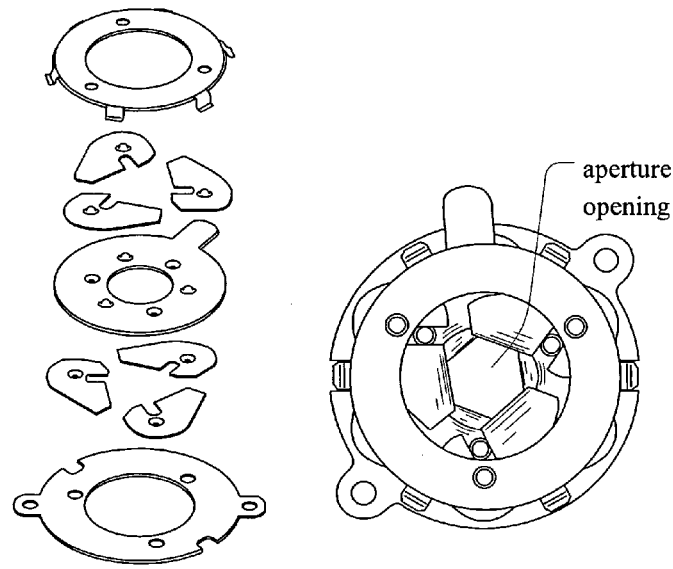
FIG. 2
(PRIOR ART)
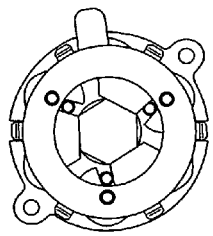
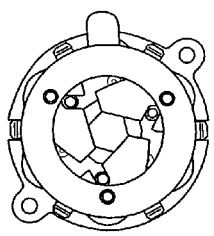
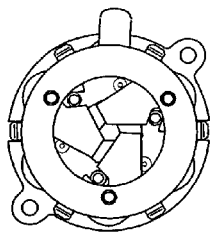
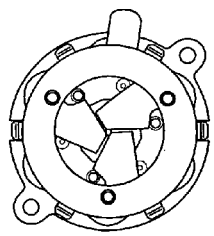
FIG. 2A  FIG. 2B  FIG. 2C  FIG. 2D
(PRIOR ART)  (PRIOR ART)  (PRIOR ART)  (PRIOR ART)

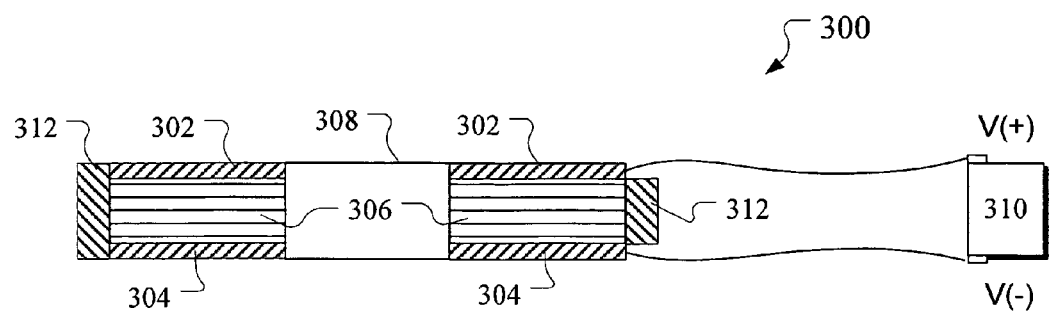
FIG. 3A
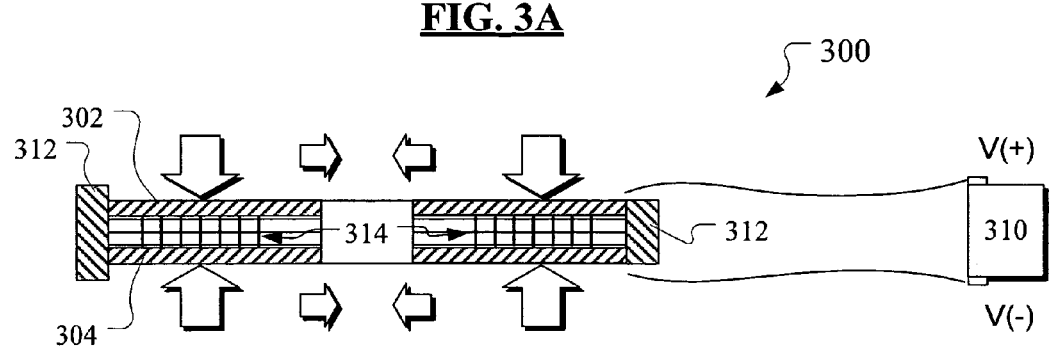
FIG. 3B
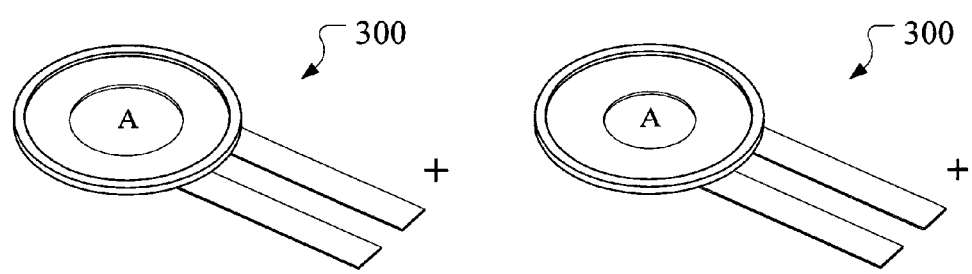
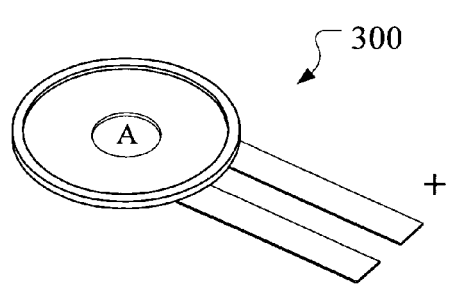
FIG. 4A
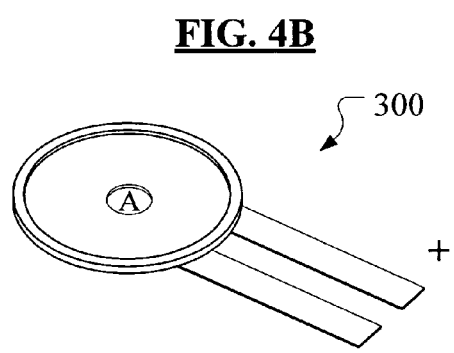
FIG. 4B
FIG. 4C
FIG. 4D ic field of the invention

APERTURE CONSTRUCTION FOR A MOBILE CAMERA

TECHNICAL FIELD OF THE INVENTION

The invention relates in general to the field of digital cameras, especially small digital cameras. In particularly the invention relates for adjusting an aperture for mobile cameras.

BACKGROUND OF THE INVENTION

Nowadays mobile cameras, such as digital cameras and mobile phone cameras are very common. The size of the mobile camera has an essential role, when the mobile camera is integrated with other mobile device, such as a mobile phone, watch, MP3-player or pocket computer. The size of the camera can be reduced by reducing the size of the camera's components, such as lens, shutter, aperture construction (sometimes combination of shutter and aperture, namely diaphragm shutter) and image sensors. The smaller the camera's component, the smaller the camera is and also smaller the end product. Also the simplicity, reliability and power consumption of the camera's components are very important factors in mobile camera devices.

It is also common to minimize number of components or limit their adjustability in order to achieve small size. These solutions are typically compromises between overall size and achieved image quality, or lead to decrease in range of usability.

The present invention addresses to develop especially the aperture constructions of the camera's components. The camera's aperture is used for controlling the amount of light that reaches the film or digital sensor. The aperture means the diameter of the lens opening. The larger the diameter of the aperture, the more light reaches the film/image sensor. Aperture is expressed by F-number so that the smaller the F-number (or f/value), the larger the lens opening (aperture).

Aperture size affects to the depth-of-field. Small aperture (high f-number, such as f/22 in FIG. 1A) increases the sharpness of distant objects, or in other words increases depth-of-field, which means more elements of a picture, from foreground to background, become sharply focused. This can create a distinct sense of depth to a photograph, drawing the viewer into the picture. It is well known that small apertures are used especially for most landscape photographs.

The effect of large aperture (small f-number, such as f/4) is illustrated in FIG. 1B. The large aperture produces shallow depth-of-field, which means the area of sharp focus in the picture will be small. It is well known that small apertures are used especially for isolating the subject of the picture while throwing the background and other distracting elements out of focus. Some useful applications of large apertures include portraits and wildlife close-ups.

Generally speaking one can say that the unfocused light will become sharper as the aperture number increases (aperture size becomes smaller).

An exploded view of a traditional prior art implementation for adjustable aperture is shown in FIG. 2. The prior art implementation comprises complex wing mechanism that needs an actuator, for example stepper motor, for operation (part count typically over 10 pcs). The wing mechanism can be operated with the actuator so that desired aperture size is achieved, as illustrated in FIGS. 2A-2D.

However, some problems relate to the prior art aperture implementations. At first they are very complex whereupon there is a risk to break down or jam. Secondly the shape of the prior art aperture is not fully circular, which can affect distortions into the picture. In addition weight and size of the prior art aperture are not easily reduced by conventional manners. Furthermore the manufacturing of the prior art aperture implementation is quite complex and time consuming because of the complexity of the aperture structure.

SUMMARY OF THE INVENTION

The object of the invention is to overcome the problems related to the prior art aperture implementations above. Especially the object of the invention is to reduce the complexity and size of the prior art aperture, simplify the manufacturing process, and provide a fully adjustable stepless aperture with a circular shape and with minimal power consumption.

The object of the invention is achieved with features described in independent claims. Especially the object of the invention is achieved by an adjustable aperture construction comprising at least two electrodes, an electrical circuit for applying a voltage to the electrodes in order to create an electric field between the electrodes, a center unit made of an electroactive material, where the center unit is placed essentially between the electrodes, and where the shape of the center unit is deformed by the electric field created between said electrodes by said electrical circuit thereby adjusting the aperture.

The present invention relates to an adjustable aperture construction for a camera according to claim 1.

Further the present invention relates to a mobile camera comprising an adjustable aperture construction according to claim 8.

In addition the present invention relates to a method for adjusting an aperture of a camera according to claim 9.

The present invention relates also to a use of a deformable electroactive material in adjustable aperture construction for a camera according to claim 10.

The embodiments of the present invention change the prior art mechanical structure implemented with several moving parts, which have been used to construct an adjustable hole traditionally, to one piece element with no moving parts and built-in sensing capability. Therefore the system complexity will reduce significantly and the size becomes smaller.

One important part of the aperture (construction?) of the present invention is a center unit. The center unit, with no separated moving parts, is capable of expanding and retracting the aperture in the middle. One advantageous idea of the invention is based on to the utilization of an electroactive material, such as a dielectric material or electrostrictive polymer, which is placed between electrodes. Applied voltage will create an electrical field between the electrodes, which will then deform, "squeeze", the electroactive material, causing it to expand and/or retract. The aperture size is controlled with operating voltage by an operating circuit and measured by the capacitance or resistance of the circuit. Thus a very simple application is enabled with built-in sensing capability.

Embodiments of the invention offer clear advantages over the known prior art. The system complexity can be reduced to one element instead of 10-20 pcs of small parts. Moreover the current aperture size can be sensed easily and accurately by electrically from capacitance or resistance value of the circuit controlling the center unit. The weight and size of the aperture unit is much smaller than in conventional apertures. In addition the aperture of the invention only consumes power when the aperture size is changed. In a static state (fixed aperture size is maintained) no current goes through the system. Furthermore fully adjustable (stepless) aperture without moving parts and fully circular aperture shapes can be created. Still the aperture of the invention can be used as a diaphragm shutter (combination of shutter and aperture) because of rapid response times (mSec levels) because of the electroactive material used in the center unit of the aperture.

The exemplary embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE DRAWINGS

Next the invention will be described in greater detail with reference to exemplary embodiments in accordance with the accompanying drawings, in which:

FIGS. 1A-B illustrate effects of different aperture sizes (f-number) to the depth-of-field in two exemplary pictures, FIG. 2 illustrates an exemplary exploded view of an implementation for adjustable aperture construction known from the prior art, FIGS. 2A-D illustrate different aperture sizes achieved by a wing mechanism with the actuator known from the prior art, FIG. 3A illustrates, as an example, a section view of an aperture construction according to an advantageous embodiment of the present invention, FIG. 3B illustrates, as an example, a section view of an aperture construction according to an advantageous embodiment of the present invention, when an electric field is applied between electrodes, and FIGS. 4A-D illustrates, as an example, perspective views of an aperture construction with different aperture sizes achieved by changing en electric field between electrodes according to an advantageous embodiment of the present invention.

DETAILED DESCRIPTION

FIGS. 1A-B illustrating effects of different aperture sizes (f-number) to the depth-of-field in two exemplary pictures, as well as FIG. 2 illustrating an exemplary exploded view of an implementation for adjustable aperture construction known from the prior art, and FIGS. 2A-D illustrating different aperture sizes achieved by a wing mechanism with the actuator known from the prior art, have already discussed in the connection with the prior art description (background of the invention chapter).

FIG. 3A illustrates a section view of an aperture construction 300 according to an advantageous embodiment of the present invention, where the aperture construction comprises a positive electrode 302 and negative electrode 304. Between the positive and negative electrodes is placed a center unit 306 with a hole 308 in the middle. The center unit is made of an electroactive material. Moreover the aperture construction comprises also an electrical circuit 310 for applying a voltage to the electrodes 302, 304 in order to create an electric field between the electrodes and to thereby control the aperture size. The electrical circuit 310 is also used for measuring the size of the aperture based on the capacitance or resistance of the circuit. Around the electroactive material 306 there is a rigid metal frame 312 forming the structure of the aperture construction.

The aperture (size of the hole 308) is adjusted by deforming the shape of the center unit 306, which shape is deformed by changing the electric field created between said electrodes 302, 304 using said electrical means 310.

FIG. 3B illustrates a section view of an aperture construction 300 according to an advantageous embodiment of the present invention, when an electric field 314 is applied between electrodes 302, 304. An example of an aperture construction 300 comprises a circular piece of thin foil/sheet of dielectric material (silicon/polymer based) between two electrodes 302, 304 and with a hole in the middle. When a voltage is applied, the electrodes 302, 304 will attract each other due to the resulted electrical field 314. The insulator (=dielectric sheet) will then be compressing in thickness direction and expanding in x-y-directions (volume is maintained) as illustrated by the thick arrows in FIG. 3B.

Outside the circular sheet there is a rigid metal frame 312 to force all the expansion towards the centerpoint thus changing the aperture size (typically the hole size can be changed few millimeters). The electrical field can be adjusted with the value of input voltage [V(+), V(−)]. Power is only consumed when the aperture size is changed, and no current flows through when the required shape is maintained FIGS. 4A-D illustrate perspective views of an aperture construction 300 with different aperture sizes A achieved by changing an electric field between electrodes (+, −) according to an advantageous embodiment of the present invention.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The invention claimed is:

1. An adjustable aperture construction for a camera, the adjustable aperture construction comprising:
   at least two electrodes,
   an electrical circuit for applying a voltage to the electrodes in order to create an electric field between the electrodes,
   a center unit with a hole in the middle as an aperture, the center unit being made of an electroactive material and placed essentially between the electrodes, and
   where the center unit is deformed, expanded or retracted by applying the electric field between said electrodes using said electrical circuit and thereby adjusting the aperture in the center unit.

2. An adjustable aperture construction according to claim 1, wherein said center unit is adapted to expand and retract the aperture in the middle of said center unit, when said electric field is applied.

3. An adjustable aperture construction according to claim 1, wherein said center unit is essentially circular comprising a hole essentially in the midpoint.

4. An adjustable aperture construction according to claim 1, wherein said center unit is made of dielectric material.

5. An adjustable aperture construction according to claim 1, wherein said center unit is made of electrostrictive polymer.

6. An adjustable aperture construction according to claim 1, wherein the aperture size is controlled with operating voltage of the electrical circuit.

7. An adjustable aperture construction according to claim 1, wherein the aperture size is measured by capacitance or resistance of the electrical circuit applying the voltage to the electrodes.

8. A mobile camera comprising an adjustable aperture construction, the adjustable aperture construction comprising:
- at least two electrodes,
- an electrical circuit for applying a voltage to the electrodes in order to create an electric field between the electrodes,
- a center unit with a hole in the middle as an apenure, the center unit being made of an electroactive material and placed essentially between the electrodes, and
- where the center unit is deformed, expanded or retracted by applying the electric field between said electrodes using said electrical circuit and thereby adjusting the aperture in the center unit.

9. Method for adjusting an aperture of a camera, the adjustable aperture construction comprising:
- at least two electrodes,
- an electrical circuit for applying a voltage to the electrodes in order to create an electric field between the electrodes,
- a center unit with a hole in the middle as an aperture, the center unit being made of an electroactive material and placed essentially between the electrodes, the method comprising:
- deforming, expanding or retracting the center unit by applying the electric field between said electrodes using said electrical circuit, and
- thereby adjusting the aperture in the center unit.

10. Use of a deformable electroactive material in adjustable aperture construction for a camera, the adjustable aperture construction comprising:
- at least two electrodes,
- an electrical circuit for applying a voltage to the electrodes in order to create an electric field between the electrodes,
- a center unit with a hole in the middle as an aperture, the center unit being made of said deformable electroactive material and placed essentially between the electrodes, the use comprising:
- deforming, expanding or retracting the center unit by applying the electric field between said electrodes using said electrical circuit, and
- thereby adjusting the aperture in the center unit.

* * * * *

UNITED STATES PATENT AND TRADEMARK OFFICE
CERTIFICATE OF CORRECTION

PATENT NO. : 7,585,122 B2
APPLICATION NO. : 11/377905
DATED : September 8, 2009
INVENTOR(S) : Marko Eromäki It is certified that error appears in the above-identified patent and that said Letters Patent is hereby corrected as shown below:

In column 5, line 6 "apenure" should be --aperture--.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,585,122 B2  Page 1 of 1
APPLICATION NO. : 11/377905
DATED : September 8, 2009
INVENTOR(S) : Marko Eromäki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 515 days.

Signed and Sealed this

Fourteenth Day of December, 2010

David J. Kappos
*Director of the United States Patent and Trademark Office*